United States Patent
Haraguchi et al.

(10) Patent No.: US 9,382,401 B2
(45) Date of Patent: Jul. 5, 2016

(54) NONDRYING POLYMER HYDROGEL

(71) Applicants: DIC Corporation, Tokyo (JP);
Kawamura Institute of Chemical Research, Sakura-shi (JP)

(72) Inventors: Kazutoshi Haraguchi, Sakura (JP);
Katsuhito Kuroki, Sakura (JP)

(73) Assignees: DIC Corporation, Tokyo (JP);
Kawamura Institute of Chemical Research, Sakura-shi (JP)

( * ) Notice: Subject to any disclaimer, the term of this patent is extended or adjusted under 35 U.S.C. 154(b) by 0 days.

(21) Appl. No.: 14/357,680

(22) PCT Filed: Jun. 19, 2013

(86) PCT No.: PCT/JP2013/066841
§ 371 (c)(1),
(2) Date: May 13, 2014

(87) PCT Pub. No.: WO2014/007062
PCT Pub. Date: Jan. 9, 2014

(65) Prior Publication Data
US 2014/0343209 A1  Nov. 20, 2014

(30) Foreign Application Priority Data
Jul. 5, 2012  (JP) ................... 2012-151380

(51) Int. Cl.
*C08K 3/28* (2006.01)
*C08K 3/10* (2006.01)
*C08J 3/075* (2006.01)
*C08L 101/14* (2006.01)
*C08J 5/18* (2006.01)
*C08K 3/22* (2006.01)
*C08K 5/098* (2006.01)
*C08L 33/26* (2006.01)
*C08K 3/16* (2006.01)
*C08F 220/56* (2006.01)

(52) U.S. Cl.
CPC . *C08K 3/28* (2013.01); *C08J 3/075* (2013.01);
*C08J 5/18* (2013.01); *C08K 3/10* (2013.01);
*C08K 3/16* (2013.01); *C08K 3/22* (2013.01);
*C08K 5/098* (2013.01); *C08L 33/26* (2013.01);
*C08L 101/14* (2013.01); *C08F 220/56*
(2013.01); *C08J 2300/14* (2013.01); *C08J 2333/26* (2013.01); *C08K 2003/162* (2013.01);
*C08K 2003/166* (2013.01)

(58) Field of Classification Search
CPC .......... H04L 5/003; H04L 5/006; H04L 5/14;
H04L 5/0062; H04L 5/22; H04L 5/26; H04L
5/1469; H04B 7/265; H04J 3/1694; H04W
24/08
USPC ................................. 524/445, 429
See application file for complete search history.

(56) References Cited

U.S. PATENT DOCUMENTS

| 4,830,913 A | 5/1989 | Ortmans et al. |
| 5,622,168 A | 4/1997 | Keusch et al. |
| 2001/0049413 A1* | 12/2001 | Haraguchi ............. 524/446 |
| 2006/0148958 A1* | 7/2006 | Haraguchi et al. ......... 524/445 |

FOREIGN PATENT DOCUMENTS

| EP | 2330174 A1 | 6/2011 |
| JP | 55-045626 A | 3/1980 |
| JP | 07-051093 A | 2/1995 |
| JP | 2002-053629 A | 2/2002 |
| JP | 2005-097457 A | 4/2005 |
| JP | 2006-028446 A | 2/2006 |
| JP | 2007-125762 A | 5/2007 |
| JP | 4759165 B2 | 8/2011 |

OTHER PUBLICATIONS

Haraguchi et al., "The unique optical and physical properties of soft, transparent, stimulus-sensitive nanocomposite gels", Proc. SPIE 6654, Liquid Crystals XI, 66540O (Sep. 12, 2007).*
Haraguchi et al.,"Nanocomposite Hydrogels: A Unique Organic-Inorganic Network Structure with ExtraordinaryMechanical, Optical, and Swelling/De-swellingProperties, Advanced Materials", 14, 1120-1124, Aug. 16, 2002.*
Haraguchi, et al. "Stimuli-responsive nanocomposite gels", Colloid and Polymer Science, 289, 455-473, Jan. 25, 2011.*

(Continued)

*Primary Examiner* — Randy Gulakowski
*Assistant Examiner* — Christopher M Rodd
(74) *Attorney, Agent, or Firm* — Locke Lord LLP; James E. Armstrong, IV; Nicholas J. DiCeglie, Jr.

(57) ABSTRACT

The problem to be solved is to provide a nondrying polymer hydrogel, which is not dried under atmospheric conditions and has excellent mechanical properties, and a method for producing the nondrying polymer hydrogel. A nondrying polymer hydrogel having both excellent nondrying properties and mechanical properties (e.g., excellent elongation properties, compression properties, and surface adhesiveness) can be produced by using a nondrying polymer hydrogel including a deliquescent substance in such a manner that the water vapor pressure shown by the polymer hydrogel is equal to or lower than the water vapor partial pressure in the atmosphere, in particular, by allowing a deliquescent substance to be contained at a high concentration in a polymer hydrogel having a network structure formed by a polymer of a water-soluble radically-polymerizable organic monomer having a specific chemical composition and a delaminated water-swellable clay mineral.

16 Claims, No Drawings

(56) References Cited

OTHER PUBLICATIONS

Haraguchi et al, "Effects of Clay Content on the Properties of Nanocomposite HydrogelsComposed of Poly(N-isopropylacrylamide) and Clay", Macromolecules 35, 10162-10171, Dec. 4, 2002.*

Haraguchi et al., "Compositional Effects on Mechanical Properties of Nanocomposite Hydrogels Composed of Poly(N,N-dimethylacrylamide) and Clay", Macromolecules, 36, 5732-5741, Jul. 1, 2003.*

Abdurrahmanoglu et al "Equilibrium Swelling Behavior and Elastic Properties of Polymer—Clay Nanocomposite Hydrogels" Journal of Applied Polymer Science, vol. 109, 3714-3724, Jun. 4, 2008.*

Extended European Search Report, issued in corresponding European Patent Application No. EP 13813936.5, dated Jun. 9, 2015.

International Search Report dated Sep. 17, 2013, issued for PCT/JP2013/066841.

* cited by examiner

NONDRYING POLYMER HYDROGEL

TECHNICAL FIELD

The present invention relates to a nondrying polymer hydrogel which is excellent in nondrying properties in the atmosphere and mechanical properties.

BACKGROUND ART

A polymer gel is a soft material which is swollen by containing a large amount of water or an organic solvent as a medium in a three-dimensional network of an organic polymer, and widely used in various fields, such as medical, food, construction, and sport fields. In particular, a polymer gel containing water as a medium is called "polymer hydrogel". In recent years, a nanocomposite hydrogel (below, abbreviated as "NC gel"), which contains an aqueous medium in a three-dimensional network obtained by using a delaminated clay mineral as a super-multifunctional crosslinking agent for an organic polymer, has been attracting attention as a polymer hydrogel having high water-swellable properties and excellent mechanical characteristics (Patent Document No. 1). However, in general, the polymer hydrogel containing water as a medium has a problem of drying in the atmosphere.

The NC gel also has the same problem. When the NC gel is allowed to stand at room temperature and is exposed to the atmosphere, the moisture in the NC gel gradually evaporates and the NC gel is dried. Some methods for inhibiting drying resulting from leaving in the atmosphere have been suggested. For example, Patent Document No. 2 discloses a polymer gel maintaining flexibility without drying, which is obtained by using a low volatile medium, such as glycerin, and 1,3-butylene glycol, instead of water. In addition, Patent Document No. 3 discloses a technique of covering the surface of the polymer hydrogel with a water-impermeable material. Although, a small amount of water can be contained together with the low volatile medium in the polymer gel disclosed in Patent Document No. 2, the main medium is the low volatile medium, not water. The polymer gel disclosed in Patent Document No. 3 is not a polymer gel containing water as the main medium. In addition, since the polymer hydrogel is entirely covered with a different material in Patent Document No. 3, the surface of the polymer hydrogel does not have hydrophilicity as a hydrogel, and water does not move in and out through the surface of the polymer hydrogel. The polymer hydrogel in Patent Document No. 3 does not have the inherent properties of the polymer hydrogel. It is thought that a polymer hydrogel containing a large amount of an aqueous medium and having nondrying properties which is not dried under general atmospheric conditions, and a polymer hydrogel having both nondrying properties and excellent mechanical properties (for example, excellent elongation properties, compression properties, and surface adhesiveness) can be effectively used in various fields in the atmosphere. Due to this, development of the polymer hydrogel has been expected.

PRIOR ART DOCUMENT

Patent Document

Patent Document No. 1: Japanese Patent No. 04759165
Patent Document No. 2: Japanese Unexamined Patent Application, First Publication No. 2006-28446
Patent Document No. 3: Japanese Unexamined Patent Application, First Publication No. 2007-125762

DISCLOSURE OF THE INVENTION

Problems to be Solved

The problem to be solved by the present invention is to provide a polymer hydrogel, which is not dried under atmospheric conditions and has excellent mechanical properties; and a method for producing the polymer hydrogel.

Means for Solving the Problem

As a result of conducting extensive studies to solve the problem, the present inventors found that a polymer hydrogel having nondrying properties under atmospheric conditions could be obtained by allowing a deliquescent substance to be contained at a high concentration in the polymer hydrogel. The present inventors also found that a polymer hydrogel having both nondrying properties in the atmosphere and excellent mechanical properties (for example, excellent elongation properties, compression properties, and surface adhesiveness/surface sliding properties) could be obtained by allowing a deliquescent substance to be contained at a high concentration in the polymer hydrogel having a network formed by a polymer of a water-soluble radically-polymerizable organic monomer having a specific composition and a delaminated water-swellable clay mineral. Thereby, the present invention was achieved.

In other words, the present invention provides the following nondrying polymer hydrogels and method for producing the same.
(1) A nondrying polymer hydrogel including a deliquescent substance in such a manner that the water vapor pressure shown by the polymer hydrogel is equal to or lower than the water vapor partial pressure in the atmosphere.
(2) The nondrying polymer hydrogel according to (1), wherein the deliquescent substance is one kind or a mixture containing at least two kinds selected from the group consisting of metal chlorides, metal nitrates, metal nitrites, metal hydroxides, and organic salts.
(3) The nondrying polymer hydrogel according to (2), wherein the metal in the metal chlorides, metal nitrates, metal nitrites, metal hydroxides, and organic salts is selected from the group consisting of lithium, sodium, potassium, magnesium, calcium, iron, and cobalt.
(4) The nondrying polymer hydrogel according to (2) or (3), wherein the deliquescent substance is neutral when absorbing water.
(5) The nondrying polymer hydrogel according to any one of (1) to (4), wherein the polymer hydrogel has a network formed by a polymer of a water-soluble radically-polymerizable organic monomer and a delaminated water-swellable clay mineral.
(6) The nondrying polymer hydrogel according to any one of (1) to (5), wherein the polymer hydrogel has an uneven pattern on the surface thereof
(7) The nondrying polymer hydrogel according to (5) or (6), wherein the water-soluble radically-polymerizable organic monomer is a mixture containing at least one monomer having an amide group, and a mass ratio (W clay/W monomer) between the mass (W clay) of the delaminated water-swellable clay mineral and the mass (W monomer) of the water-soluble radically-polymerizable organic monomer is in a range of 0.03 to 1.5.
(8) The nondrying polymer hydrogel according to any one of (1) to (7), wherein the content of the deliquescent substance in the polymer hydrogel is 2 liters or more relative to 1 liter of $H_2O$ in the polymer hydrogel.

(9) A method for producing the nondrying polymer hydrogel according to any one of (1) to (8), wherein the polymer hydrogel or a dried polymer hydrogel is immersed in an aqueous solution containing the deliquescent substance at a temperature in a range of 5 to 95° C. to introduce the deliquescent substance into the polymer hydrogel.

Effects of the Present Invention

The nondrying polymer hydrogel according to the present invention maintains a large amount of water even when it is allowed to stand in the atmosphere, and has characteristics of a nondrying polymer hydrogel. Moreover, the water content in the nondrying polymer hydrogel varies depending on the humidity and temperature of the atmosphere. In addition, the nondrying polymer hydrogel according the present invention has both the nondrying properties and excellent mechanical properties, such as elongation properties (high strength and high extensibility), compression properties (high strength and high compressibility), flexibility, surface adhesiveness, and surface sliding properties. Furthermore, the nondrying polymer hydrogel according to the present invention is transparent, and has capability of being formed in various shapes, having various surface shapes (one or both sides), and response capability to the moisture in the environment.

EMBODIMENTS OF THE PRESENT INVENTION

In the nondrying polymer hydrogel according to the present invention, it is essential to include a deliquescent substance in an aqueous medium in a polymer network in such a manner that the water vapor pressure shown by the polymer hydrogel is equal to or lower than the water vapor partial pressure in the atmosphere.

In the nondrying polymer hydrogel according to the present invention, the network is a three-dimensional network in which hydrophilic polymer chains are bonded in crosslinking points. Examples of the three-dimensional network include a network having crosslinking points formed by ion bond, hydrogen bond, coordinate bond, entanglement, fine crystal, helix, or a topological ring, in addition to a network having chemical crosslinking points formed by the covalent bond generated by using an organic crosslinking agent, or radiation exposure. In addition, the network in the present invention may be a network in which two kinds of networks are interpenetrated each other. Among these crosslinking points, a crosslinking point, which is formed by using a delaminated water-swellable clay mineral, is most preferable. In particular, the nondrying polymer hydrogel having a network including the delaminated clay mineral and a polymer has a characteristic of having both nondrying properties and excellent mechanical properties (for example, excellent elongation properties, compression properties, surface adhesiveness and/or surface sliding properties).

As the polymer used in the nondrying polymer hydrogel according to the present invention, it is necessary to be a hydrophilic polymer which can contain a large amount of an aqueous medium. Examples of the hydrophilic polymer which can contain a large amount of an aqueous medium include a hydrophilic polymer having an amide group, hydroxyl group, carboxyl group, amino group, ether group, or ester group in its polymeric chain. In particular, the hydrophilic polymer having an amide group, hydroxyl group, or carboxyl group is most preferable.

The nondrying polymer hydrogel according to the present invention has favorably both nondrying properties and mechanical properties. The nondrying polymer hydrogel of the present invention includes the deliquescent substance in a network, for example, a network having a same length of a chain between the crosslinking points, a network including a mobile topological ring, a network formed by interpenetrating two kinds of crosslinked polymer chains each other, or a network including the delaminated clay mineral as a crosslinking point. As the nondrying polymer hydrogel which is excellent in all of nondrying properties, ease of synthesis, and mechanical strength, such as elongation properties, compression properties, capability of having a various shaped surface, and surface adhesiveness/surface sliding properties, a polymer hydrogel can be exemplified which includes both water and the deliquescent substance in a network formed by a polymer of a water-soluble radically-polymerizable organic monomer and a delaminated water-swellable clay mineral. The water-soluble radically-polymerizable organic monomer preferably has solubility in water, and produces a polymer having an interaction with a water-swellable clay mineral which can be uniformly dispersed in water. For example, the water-soluble radically-polymerizable organic monomer preferably has a functional group which can form a hydrogen bond, ion bond, coordinate bond, or covalent bond with the clay mineral. Examples of the water-soluble polymerizable organic monomer having such a functional group include a water-soluble organic monomer having a polymerizable unsaturated group containing an amide group, ester group, or hydroxyl group. In particular, a water-soluble organic monomer having a polymerizable unsaturated group containing an amide group is most preferable.

Examples of the water-soluble organic monomer having a polymerizable unsaturated group containing an amide group include acrylamide, an acrylamide derivative monomer, methacrylamide, and a methacrylamide derivative monomer. In particular, acrylamide and an acrylamide derivative monomer are preferable. Examples of the acrylamide derivative monomer include N-alkyl acrylamide, and N,N-dialkyl acrylamide. Examples of the methacrylamide derivative monomer include N-alkyl methacrylamide, and N,N-dialkyl methacrylamide. As the alkyl group, the alkyl group having 1 to 4 carbon atoms is preferable.

As the water-soluble radically-polymerizable organic monomer, it is effective to use one of the water-soluble organic monomer having a polymerizable unsaturated group explained above, a combination of multiple water-soluble organic monomers having a polymerizable unsaturated group selected from them, or a combination of the water-soluble radically-polymerizable organic monomer having an amide group and the water-soluble radically-polymerizable organic monomer having a hydroxyl group or an ester group other than an amide group. In particular, water-soluble radically-polymerizable organic monomer having an amide group, such as N,N-dimethyl acrylamide, has a strong interaction with the water-swellable clay mineral which works as a crosslinking point in the organic-inorganic composite gel. Therefore, the polymer hydrogel having a high mechanical strength can be produced. Therefore, when water-soluble radically-polymerized organic monomer having a functional group other than an amide group is used, it is preferable to use a water-soluble radically-polymerized organic monomer having an amide group at the same time to improve the mechanical strength.

It is preferable that the water-swellable clay mineral used in the present invention have properties in which an interval between layers expands due to water. It is more preferable that at least part of the water-swellable clay mineral be delaminated and dispersed in water. In particular, it is most preferable that the water-swellable clay mineral be a layered clay mineral which can be delaminated so as to include a layer of only one to ten, and dispersed uniformly in water. For example, as the water-swellable clay mineral, water-swellable smectite or water-swellable mica is used. More specifically, water-swellable hectorite, water-swellable montmorillonite, water-swellable saponite, or water-swellable synthetic mica, which includes sodium ion as an intercalating ion, can be used in the present invention.

The mass ratio (W clay/W monomer) of the water-swellable clay mineral relative to the water-soluble radically-polymerizable organic monomer is preferably in a range of 0.03 to 1.5, more preferably in a range of 0.05 to 1.0, and most preferably in a range of 0.1 to 0.7. Moreover, "W monomer" means the mass of the water-soluble radically-polymerizable organic monomer, and "W clay" means the mass of the water-swellable clay mineral. When the W clay/W monomer is less than 0.03, the crosslinking density of the polymer hydrogel is small, and thereby the mechanical strength of the polymer hydrogel obtained is often insufficient. In contrast, when the W clay/W monomer exceeds 1.5, the crosslinking density of the polymer hydrogel is too large, sufficient degree of swelling is not often obtained. When the mass ratio of the water-swellable clay mineral in the obtained nondrying polymer hydrogel is relatively small, the surface of the obtained nondrying polymer hydrogel is sticky. In contrast, when the mass ratio of the water-swellable clay mineral in the obtained nondrying polymer hydrogel is relatively large, the surface of the obtained nondrying polymer hydrogel is slippery.

The nondrying polymer hydrogel according to the present invention is produced using a large amount of an organic crosslinking agent or inorganic crosslinking agent. The nondrying polymer hydrogel according to the present invention preferably includes water and a deliquescent substance in a three-dimensional network formed by the polymer of the water-soluble radically-polymerizable organic monomer and the delaminated water-swellable clay mineral. In the nondrying polymer hydrogel, the delaminated water-swellable clay mineral works as a crosslinking agent and forms the three-dimensional network together with the polymer of the water-soluble radically-polymerizable organic monomer. Therefore, compared with the polymer hydrogel including medium in a chemically-crosslinked three-dimensional network obtained using a conventional organic crosslinking agent, the nondrying polymer hydrogel according to the present invention has both high nondrying properties and extremely high mechanical properties (for example, excellent elongation properties, such as high strength, high elongation properties, and controlled elasticity; compression properties, such as high strength, high compressibility, and controlled compressibility; flexibility; surface adhesiveness; and surface sliding properties). In addition, the nondrying polymer hydrogel according to the present invention is transparent and is capable of being formed in various shapes, and having various surface shapes. The nondrying polymer hydrogel including the water-swellable clay mineral as a crosslinking agent does not need to include an organic crosslinking agent used in ordinary polymer hydrogel.

However, it is favorable to include the organic crosslinking agent as long as the organic crosslinking agent does not affect the excellent mechanical properties which are one object of the present invention and the introduction of the deliquescent substance at a high concentration. The amount of the organic crosslinking agent that is available to be used is different depending on the kind of the organic crosslinking agent used. However, in general, the amount of the organic crosslinking agent relative to 1 mol of the water-soluble radically-polymerizable organic monomer is in a range of 0.001 to 1% by mol, more preferably in a range of 0.002 to 0.2% by mol, and most preferably in a range of 0.005 to 0.1 mol. When the amount of the organic crosslinking agent relative to 1 mol of the water-soluble radically-polymerizable organic monomer exceeds 1% by mol, the toughness of the obtained nondrying polymer hydrogel often decreases. As the organic crosslinking agent, conventional organic crosslinking agents can be used. Examples of the organic crosslinking agent used in the present invention include polyfunctional acrylamide, such as N,N'-methylene bisacrylamide, and polyfunctional (meth)acrylate, such as diethylene glycol (meth)acrylate, and dipolyethylene glycol (meth)acrylate. When the organic crosslinking agent is used at the same time, it is possible to decrease the surface adhesiveness of the nondrying polymer hydrogel. Therefore, when slipping properties are necessary, it is possible to give the slipping properties to the whole nondrying polymer hydrogel or only the surface of the nondrying polymer hydrogel, where the slipping properties are necessary, by using the organic crosslinking agent in a synthesis of the nondrying polymer hydrogel.

Examples of the deliquescent substance used in the present invention include deliquescent inorganic compositions, such as metal chlorides, metal nitrates, metal nitrites, metal acetates, metal hydroxides, and metal carbonates; and deliquescent organic compositions. Metal chlorides, metal nitrates, and metal nitrites are preferably used. In particular, metal chlorides are more preferable. Examples of the metal in the deliquescent inorganic compounds, such as metal chlorides, metal nitrates, metal nitrites, metal acetates, metal hydroxides, and metal carbonates include lithium, sodium, potassium, magnesium, calcium, iron, and cobalt. Lithium, sodium, potassium, magnesium, and calcium are preferably used. Lithium, sodium, and magnesium are more preferably used. In particular, magnesium is most preferably used. Examples of the deliquescent inorganic compound used in the present invention include metal chlorides, such as $MgCl_2$, $CaCl_2$, $CoCl_2$, $LiCl$, $ZnCl_2$, $AlCl_3$, and $FeCl_3$; metal nitrites, such as $NaNO_2$, and $KNO_2$; metal nitrates, such as $NaNO_3$; metal hydroxides, such as $NaOH$, $KOH$, and $LiOH$; metal carbonates, such as $K_2CO_3$, and $NaHCO_3$; and metal acetates, such as $CH_3COONa$.

Examples of the deliquescent organic compounds include citric acid, sodium valproate, splatast tosilate, pyridostigmine bromide, and Quercus salicine extract.

Among these deliquescent substances, deliquescent substances having high safety, such as $MgCl_2$, $CaCl_2$, and $K_2CO_3$ are most preferably used. In addition, it depends on a use, in general, the deliquescent substances, of which the aqueous solution is around neutral, are often preferably used.

It is essential that the deliquescent substance be contained in the nondrying polymer hydrogel of the present invention in such a manner that the water vapor pressure shown by the polymer hydrogel is equal to or lower than the water vapor partial pressure in the atmosphere. Specifically, although the amount of the deliquescent substance varies depending on the nature of the deliquescent substance, the amount of the deliquescent substance relative to 1 liter of water contained in the polymer hydrogel is preferably 2 mols or more. When the amount of the deliquescent substance relative to 1 liter of water is less than 2 mols, the water vapor pressure shown by the polymer hydrogel is often larger than the water vapor partial pressure in the atmosphere. The upper limit of the amount of the deliquescent substance is decided by the nature of the deliquescent substance and the network. In general, the upper limit of the amount of the deliquescent substance is 10 mols.

The production method of the nondrying polymer hydrogel according to the present invention is not particularly limited. The conditions and the kind of the production method can be selected depending on the purpose or use of the nondrying polymer hydrogel. A method is preferable, in which the polymer hydrogel prepared in advance is immersed in an aqueous solution containing the deliquescent substance with a high concentration, and maintain the temperature of the solution preferably in a range of 5 to 95° C., more preferably in a range of 30 to 90° C., and most preferably in a range of 40 to 80° C. at a fix time or more to introduce the deliquescent substance into the polymer hydrogel. Moreover, it is possible to use the dried polymer hydrogel instead of the polymer hydrogel. In addition, it is also possible to effectively introduce the powder deliquescent substance into the polymer hydrogel by directly contacting them, and maintaining them under sealed conditions. Furthermore, it is effective to introduce the deliquescent substance in the polymer hydrogel so as to make a concentration gradient in accordance with the intended use.

The mechanism of exerting the nondrying properties of the nondrying polymer hydrogel of the present invention in the atmosphere is assumed as follows. The nondrying properties of the polymer hydrogel are generated when the water vapor pressure shown by the polymer hydrogel is equal to or lower than the water vapor partial pressure in the atmosphere. Specifically, the water vapor pressure of pure water at 20° C. is 17.54 mmHg. The water vapor partial pressure under conditions, in which the temperature is 20° C. and the relative humidity is 60% or 10%, is respectively 10.52 mmHg, or 1.75 mm Hg. That is, the nondrying properties of nondrying polymer hydrogel in the present invention can be obtained by incorporating the deliquescent substance into the polymer hydrogel in such a manner that the water vapor pressure shown by the polymer hydrogel is equal to or lower than theses water vapor partial pressures in the atmosphere. Therefore, it is necessary that the network in the polymer hydrogel absorbs a large amount of water and the deliquescent substance, and that even when the polymer hydrogel absorbs the deliquescent substance with a high concentration, the polymer hydrogel, that is the network does not largely shrink. In particular, the nondrying polymer hydrogel having excellent mechanical properties and ease of synthesis in addition to the nondrying properties can be produced by forming the network using a specific polymer and the delaminated deliquescent substance.

The nondrying polymer hydrogel of the present invention not only maintains stable hydrogel states in the atmosphere but has excellent mechanical properties, such as elongation, compression, bending, and adhesiveness/sliding properties by selecting the kind of the network. In addition, it is also possible to obtain the nondrying polymer hydrogel in a large size to small size, and in various shapes, such as, a rod shape, film shape, sheet shape, spherical shape, or fine particle shape. Furthermore, it is also possible that the nondrying polymer hydrogel have excellent properties, such as transparency, and various surface shapes. In particular, the nondrying polymer hydrogel having an uneven pattern, or grooves, such as straight lines or curved lines, on the surface thereof, can adjust the adhesiveness to a substrate. In addition, it is effective to introduce or discharge gas or liquid between the surface of the nondrying polymer hydrogel and the substrate.

EXAMPLES

The present invention will be explained in detail referring Examples. However, the present invention is not limited to the following Examples.

Synthesis Examples 1 to 3

As a water-soluble radically-polymerizable organic monomer, N,N-dimethyl acrylamide (DMAA: KOHJIN Holdings Co., Ltd.) was used. As a clay mineral, a water-swellable clay mineral (synthetic hectorite: LAPONITE® XLG, Rockwood) was dried under vacuum at 120° C. for 2 hours, and used. Hyperpure water having a specific electrical resistance of 0.18 MΩm was bubbled with nitrogen for 3 hours or more to remove oxygen in advance, and used. In a 1,000 mL-round-bottom flask of which the inside had been replaced with nitrogen, 475 g of the hyperpure water was added. Then, 100 g of DMAA and 20 g of the synthetic hectorite were added in the round-bottom flask while stirring in Synthesis Example 1 (mass ratio (clay mineral/DMAA) of the clay mineral and DMAA was 0.20). 100 g of DMAA and 4 g of the synthetic hectorite were added in the round-bottom flask while stirring in Synthesis Example 2 (mass ratio (clay mineral/DMAA) of the clay mineral and DMAA was 0.04). 50 g of DMAA and 32 g of the synthetic hectorite were added in the round-bottom flask in while stirring Synthesis Example 3 (mass ratio (clay mineral/DMAA) of the clay mineral and DMAA was 0.64). Thereby, transparent uniform solutions were produced. The clay mineral was delaminated at this stage. The produced solution was slowly stirred for 10 minutes in an ice bath. Then, 320 μL of N,N,N',N'-tetramethyl ethylene diamine (TEMED: Wako Pure Chemical Industries, Ltd.) was added as a catalyst. Then, 25 mL of a polymerization initiator solution containing 100 g of the hyperpure water prepared in advance and 2 g of potassium peroxodisulfide (KPS: KANTO KAGAKU) was added in the transparent uniform solution while stirring to obtain a polymerization solution. A gel preparation member was made using two glass plates having an area of 441 cm$^2$ (210 mm×210 mm) and silicone rubber having a thickness of 8 mm and width of 10 mm as a space. Then the polymerization solution was placed in the gel preparation member under nitrogen atmosphere. The polymerization was preceded by maintaining the gel preparation member at 20° C. for 24 hours. The polymerization solution was totally gelataed, and the delaminated clay mineral worked as a crosslinking agent. Thereby, a polymer hydrogel in a sheet shape was obtained. The polymer hydrogel in a sheet shape was uniform, and colorless and transparent. According to the weight of the sheet dried, the polymerization rate of DMAA was 99.9% or more in Synthesis Examples 1 to 3. According to the results of the thermogravimetric analysis using a thermogravimetric analyzer (TG/DTA220: Seiko Instruments Inc.) of the sheet dried, the ratio (clay mineral/polymer) was substantially equal to the ratio (clay mineral/monomer). Thereby, it was confirmed that all of the clay mineral was incorporated in the network in the polymer hydrogel. The polymer hydrogel produced in Synthesis Examples 1 to 3 had extremely high mechanical toughness. In addition, a part of the polymer hydrogel sheet was cut and subjected to an elongation test (AGS-H; Shimadzu Corporation; an interval between chucks: 30 mm; and tension speed: 100 mm/min). As a result of the elongation test, the tensile strength and braking elongation of the polymer hydrogel were 260 kPa and 1,600% in Synthesis Example 1, 100 kPa and 1,700% in Synthesis Example 2, and 100 kPa and 1,700% in Synthesis Example 3.

Synthesis Example 4

A uniform pale ocher transparent polymer hydrogel sheet was produced in a manner identical to Synthesis Example 1, except that montmorillonite (Kunipia; Kunimine Industries Co., Ltd.) was used as the clay mineral instead of the synthetic hectorite. As a result of the elongation test in a manner identical to Synthesis Example 1, the tensile strength and braking elongation of the polymer hydrogel were 223 kPa and 1,900%.

Synthesis Examples 5 and 6

A chemically-crosslinked polymer hydrogel sheet was produced in a manner identical to Synthesis Example 1, except that 0.5% by mol or 1.0% by mol of an organic crosslinking agent (N,N'-methylene bisacryloamide) relative to the total amount of the monomer was used in Synthesis Examples 5 and 6. The polymerization rate of DMAA was 99.9% or more in Synthesis Examples 5 and 6. A uniform transparent polymer hydrogel sheet was produced. For the elongation test, a part of the polymer hydrogel sheet was cut. However, the polymer hydrogel sheet was ruptured when fixing it between the chucks. Therefore, it was impossible to carry out the elongation test.

Example 1

The polymer hydrogel sheet produced in Synthesis Example 1 was cut to 20 cm×20 cm. The sheet was put in a sealable flat-bottom container containing 1,140 g of 35.2% by weight-$MgCl_2$ aqueous solution at 50° C. to immerse the polymer hydrogel sheet in the $MgCl_2$ aqueous solution. At first, the concentration of $MgCl_2$ in the aqueous solution and the polymer hydrogel was 35.2% by weight and 0% by weight respectively. The concentration of $MgCl_2$ in the aqueous solution and the polymer hydrogel gradually approximated to the same concentration. When 72 hours passed, the polymer hydrogel sheet swelled, the total weight increased three times, the total surface area increased 1.9 times, and the thickness increased 1.2 times. The $MgCl_2$ concentration relative to water in the polymer hydrogel was 28.5% by weight (4 mols/1 liter of water). Part of the polymer hydrogel sheet produced was cut and the elongation test was carried out similar to Synthesis Example 1. As a result of the elongation test, the tensile strength and braking elongation of the polymer hydrogel sheet were 230 kPa and 900%. In addition, while handling the polymer hydrogel sheet accompany with bending, twisting, and compressing, the polymer hydrogel sheet was never damaged, and had excellent mechanical toughness. When the produced polymer hydrogel sheet having a $MgCl_2$ concentration of 28% by weight was allowed to stand in the atmosphere under conditions in which the temperature was varied in a range of 10 to 30° C. and the humidity was also varied in a range of 30 to 80%, and the weight variation of the polymer hydrogel sheet was measured. As a result of the measurement, the weight was varied in a range of 90%±20% of the initial weight. After leaving it for 6 months, the polymer hydrogel sheet was not dried. Thereby, it was confirmed that the nondrying produced polymer hydrogel had superior nondrying properties.

In addition, the produced nondrying polymer hydrogel sheet adhered to a various substrates. Furthermore, the produced polymer hydrogel sheet did not peel from the substrate even when the produced nondrying polymer hydrogel sheet turned downwardly.

Furthermore, the nondrying polymer hydrogel sheet having a width of 10 mm was adhered on an aluminum plate, copper plate, and concrete plate, and pressed with a load of 500 g for 30 seconds. Then, the adhered nondrying polymer hydrogel sheet was subjected to a peeling test by peeling it at a speed of 5 mm/second in a direction at an angle of 90° with respect to the surface of the produced nondrying polymer hydrogel sheet. As a result of the test, the adhesive strength to the aluminum plate, copper plate, and concrete plate was respectively 0.5 N, 0.4 N, and 1.1 N.

Examples 2 to 4

The polymer hydrogel sheet was immersed in a $MgCl_2$ aqueous solution in a manner identical to Example 1, except that the polymer hydrogel sheet prepared in the Synthesis Examples 2 to 4 was used. As a result, a sheet of a nondrying polymer hydrogel incorporating $MgCl_2$ at a high concentration was produced in Examples 2 to 4. The concentration of $MgCl_2$ in a salt water contained in the polymer hydrogel was 28.5% by weight in Example 2, 25% by weight in Example 3, and 28% by weight in Example 4. In addition, all the nondrying polymer hydrogel sheets produced in Examples 2 to 4 had excellent mechanical properties, and were not damaged at all during handling. The polymer hydrogel sheet containing $MgCl_2$ produced in Examples 2 to 4 were allowed to stand in the atmosphere in a manner identical to Example 1. After leaving it for 6 months or more, the weight was varied in a range of 90%±20% of the initial weight. The polymer hydrogel sheet was not dried in the atmosphere. The polymer hydrogel had nondrying properties. In addition, when the nondrying polymer hydrogel sheet was adhered to an aluminum plate, copper plate, and concrete plate, and then the nondrying polymer hydrogel sheet turned downwardly, the nondrying polymer hydrogel sheet did not peeled from the plate.

Example 5

A sheet of a polymer hydrogel containing a deliquescent substance was produced in a manner identical to Example 1, except that the concentration of $MgCl_2$ in the $MgCl_2$ aqueous solution was changed to 18% by weight, and the immersion time was changed to 20 hours. After 20 hours passed from start of the immersion, the polymer hydrogel sheet swelled, and the total weight increased 2.4 times. Subsequently, when the swollen polymer hydrogel sheet was allowed to stand for 24 hours in the atmosphere (temperature: 23° C.; and humidity: about 60%), the water absorbed in the polymer hydrogel sheet was discharged, and the total weight of the polymer hydrogel sheet decreased ⅔ times. The concentration of $MgCl_2$ relative to the water in the polymer hydrogel became 27.3% by weight. After that, the polymer hydrogel sheet fully stably maintained its conditions without drying. The polymer hydrogel had excellent nondrying properties.

Examples 6 and 7

A sheet of a polymer hydrogel containing a deliquescent substance was produced in a manner identical to Example 5, except that a calcium chloride aqueous solution (39.6% by weight) was used in Example 6, and a lithium chloride aqueous solution (39.4% by weight) was used in Example 7, instead of the $MgCl_2$ aqueous solution.

After immersion of the polymer hydrogel sheet in the potassium chloride aqueous solution, the polymer hydrogel sheet swollen, and the total weight increased 1.2 times in Example 6. After immersion of the polymer hydrogel in the lithium chloride aqueous solution, the polymer hydrogel sheet swollen, and the total weight increased 1.1 times in Example 7. Subsequently, when the swollen polymer hydrogel sheet was allowed to stand for 24 hours in the atmosphere (temperature: 23° C.; and humidity: about 60%), the polymer hydrogel absorbed water in the atmosphere. The weight of the polymer hydrogel sheet after 24 hours increased 1.16 times and 1.24 times relative to the weight of the swollen polymer hydrogel in Examples 6 and 7 respectively. After that, the polymer hydrogel fully stably maintained its conditions without drying. The polymer hydrogel had excellent nondrying properties.

Example 8

A sheet of a polymer hydrogel containing a deliquescent substance was produced in a manner identical to Example 1, except that a lithium nitrite aqueous solution (Refle α40; Sumitomo Osaka Cement Co., Ltd.; solid concentration: 42.74% by weight) was used instead of the $MgCl_2$ aqueous solution. After immersion of the polymer hydrogel sheet in the lithium nitrite aqueous solution, the polymer hydrogel sheet was swollen, and the total weight increased 1.3 times. The content of lithium nitrite in the polymer hydrogel sheet was 40.4% by weight. Subsequently, when the swollen polymer hydrogel sheet was allowed to stand for 1 week in the atmosphere under conditions in which the temperature was 23° C.±5° C., and the humidity was 55%+5%, the weight was hardly changed (the weight after leaving is in a range of the weight before leaving±5%). The polymer hydrogel had excellent nondrying properties.

Examples 9 and 10

The polymer hydrogel sheet was immersed in a $MgCl_2$ aqueous solution in a manner identical to Example 1, except that the polymer hydrogel sheet prepared in the Synthesis Examples 5 and 6 was used in Examples 9 and 10 respectively. As a result, a sheet of a nondrying polymer hydrogel incorporating $MgCl_2$ at a high concentration was produced in Examples 9 to 10. The concentration of $MgCl_2$ in a salt water contained in the polymer hydrogel was 27.6% by weight in Example 9, and 27.3% by weight in Example 10. However, both of the sheets obtained in Examples 9 and 10 were fragile. Therefore, much attention was required to handle the polymer hydrogel sheets to prevent the damage. After leaving the sheets in the atmosphere for 6 months or more in a manner identical to Example 1, the weight was varied in a range of 90%±20% of the initial weight. The polymer hydrogel sheets were not dried in the atmosphere. The polymer hydrogel had nondrying properties. However, the nondrying polymer hydrogel sheets were hardly adhered to an aluminum plate, copper plate, and concrete plate.

Comparative Examples 1 to 6

The polymer hydrogel sheet which contained an aqueous medium without the deliquescent substance in Synthesis Examples 1 to 6 was allowed to stand in the atmosphere in a manner identical to Example 1. As a result, the weight decreased 1/7 times. When the humidity was relatively low, the polymer hydrogel became a very hard dried gel. When the humidity was relatively high, the polymer hydrogel became a slightly soft dried gel (the moisture content was equal to or less than the dried solid content). These results showed that the polymer hydrogel, which did not contain a large amount of $MgCl_2$ or the like, could not stably contain moisture in the atmosphere, and became dried polymer hydrogel discharging water in the atmosphere. Not only the weight but the shape, such as the thickness and area of the polymer hydrogel sheet, largely decreased.

INDUSTRIAL APPLICABILITY

The nondrying polymer hydrogel according to the present invention can be used as a material which is exposed to the atmosphere, for example, adhered to a substrate, or inserted between substrates; or buried in the ground.

The invention claimed is:

1. A nondrying polymer hydrogel including a deliquescent substance in such a manner that the water vapor pressure shown by the polymer hydrogel is equal to or lower than the water vapor partial pressure in the atmosphere;
   wherein the polymer hydrogel has a network formed by a polymer of a water-soluble radically-polymerizable organic monomer and a delaminated water-swellable clay mineral; and
   the water-soluble radically-polymerizable organic monomer comprises N,N-dimethyl acrylamide.

2. The nondrying polymer hydrogel according to claim 1, wherein the deliquescent substance is one kind or a mixture containing at least two kinds selected from the group consisting of metal chlorides, metal nitrates, metal nitrites, metal hydroxides, and organic salts.

3. The nondrying polymer hydrogel according to claim 2, wherein the metal in the metal chlorides, metal nitrates, metal nitrites, and metal hydroxides is selected from the group consisting of lithium, sodium, potassium, magnesium, calcium, iron, and cobalt.

4. The nondrying polymer hydrogel according to claim 2, wherein the deliquescent substance is neutral when absorbing water.

5. The nondrying polymer hydrogel according to claim 1, wherein the polymer hydrogel has an uneven pattern on the surface thereof.

6. The nondrying polymer hydrogel according to claim 1, wherein the water-soluble radically-polymerizable organic monomer is a mixture containing at least one monomer having an amide group, and a mass ratio (W clay/W monomer) between the mass (W clay) of the delaminated water-swellable clay mineral and the mass (W monomer) of the water-soluble radically-polymerizable organic monomer is in a range of 0.03 to 1.5.

7. The nondrying polymer hydrogel according to claim 1, wherein the content of the deliquescent substance in the polymer hydrogel is 2 mols or more relative to 1 liter of $H_2O$ in the polymer hydrogel.

8. A method for producing the nondrying polymer hydrogel according to claim 1, wherein the polymer hydrogel or a dried polymer hydrogel is immersed in an aqueous solution containing the deliquescent substance at a temperature in a range of 5 to 95° C. to introduce the deliquescent substance into the polymer hydrogel.

9. The nondrying polymer hydrogel according to claim 3, wherein the deliquescent substance is neutral when absorbing water.

10. The nondrying polymer hydrogel according to claim 2, wherein the polymer hydrogel has an uneven pattern on the surface thereof.

11. The nondrying polymer hydrogel according to claim 3, wherein the polymer hydrogel has an uneven pattern on the surface thereof.

12. The nondrying polymer hydrogel according to claim 5, wherein the water-soluble radically-polymerizable organic monomer is a mixture containing at least one monomer having an amide group, and a mass ratio (W clay/W monomer) between the mass (W clay) of the delaminated water-swellable clay mineral and the mass (W monomer) of the water-soluble radically-polymerizable organic monomer is in a range of 0.03 to 1.5.

13. The nondrying polymer hydrogel according to claim 2, wherein the content of the deliquescent substance in the polymer hydrogel is 2 mols or more relative to 1 liter of $H_2O$ in the polymer hydrogel.

14. The nondrying polymer hydrogel according to claim 3, wherein the content of the deliquescent substance in the polymer hydrogel is 2 mols or more relative to 1 liter of $H_2O$ in the polymer hydrogel.

15. A method for producing the nondrying polymer hydrogel according to claim 2, wherein the polymer hydrogel or a dried polymer hydrogel is immersed in an aqueous solution containing the deliquescent substance at a temperature in a range of 5 to 95° C. to introduce the deliquescent substance into the polymer hydrogel.

16. A method for producing the nondrying polymer hydrogel according to claim 3, wherein the polymer hydrogel or a dried polymer hydrogel is immersed in an aqueous solution containing the deliquescent substance at a temperature in a range of 5 to 95° C. to introduce the deliquescent substance into the polymer hydrogel.

\* \* \* \* \*